United States Patent
Zhang et al.

(10) Patent No.: US 10,635,579 B2
(45) Date of Patent: Apr. 28, 2020

(54) OPTIMIZING TREE PRUNING FOR DECISION TREES

(71) Applicant: International Business Machines Corporation, Armonk, NY (US)

(72) Inventors: Jun Qi Zhang, Xi'an (CN); Jing Xu, Xian (CN); Xing Wei, Xi'an (CN); Zhiyuan Wang, Xian (CN); Ji Hui Yang, BeiJing (CN); Kai Xa Li, Xian (CN)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 15/995,218

(22) Filed: Jun. 1, 2018

(65) Prior Publication Data

US 2019/0370161 A1 Dec. 5, 2019

(51) Int. Cl.
*G06F 11/36* (2006.01)
*G06F 16/22* (2019.01)
*G06F 16/23* (2019.01)

(52) U.S. Cl.
CPC ...... *G06F 11/3692* (2013.01); *G06F 11/3684* (2013.01); *G06F 11/3688* (2013.01); *G06F 16/2246* (2019.01); *G06F 16/2365* (2019.01)

(58) Field of Classification Search
CPC ............. G06F 11/3684; G06F 11/3688; G06F 11/3692; G06F 11/3664; G06F 11/3612; G06N 5/025; G06N 5/04
See application file for complete search history.

(56) References Cited

U.S. PATENT DOCUMENTS

| | | | | |
|---|---|---|---|---|
| 7,190,743 B2* | 3/2007 | Learned | ................ | H04L 1/0048 |
| | | | | 375/340 |
| 8,996,436 B1* | 3/2015 | Ren | ......................... | G06N 5/02 |
| | | | | 706/46 |
| 9,122,997 B1* | 9/2015 | Yang | ...................... | G06N 20/00 |
| 2013/0166485 A1* | 6/2013 | Hoffmann | .............. | G06N 20/00 |
| | | | | 706/20 |
| 2015/0032674 A1* | 1/2015 | Cichosz | ................. | G06N 5/003 |
| | | | | 706/12 |
| 2015/0379428 A1 | 12/2015 | Dirac et al. | | |
| 2017/0090980 A1 | 3/2017 | Martin et al. | | |
| 2018/0101765 A1* | 4/2018 | Chiang | ................ | G06N 3/0454 |

* cited by examiner

*Primary Examiner* — Nadeem Iqbal

(74) *Attorney, Agent, or Firm* — Schmeiser, Olsen & Watts, LLP; Isaac Gooshaw

(57) ABSTRACT

A system and method of optimizing tree pruning for a decision tree may include splitting, a first dataset into a training dataset and a testing dataset, growing the training dataset into a first decision tree, sampling the training dataset by creating a plurality of sampling datasets from the training dataset, pruning the first decision tree using the plurality of sampling datasets, creating a plurality of models, at least one for each of the plurality of sampling datasets, and verifying the accuracy of each of the plurality of models, using the testing dataset.

20 Claims, 9 Drawing Sheets

OPTIMIZING TREE PRUNING FOR DECISION TREES

TECHNICAL FIELD

The present invention relates to systems and methods for optimizing tree pruning for decision trees. More specifically, the invention relates to systems and methods for optimizing tree pruning for big data applications having large datasets.

BACKGROUND

A decision tree is a decision support tool that uses a tree-like graph or model of decisions and their possible consequences, including chance event outcomes, resource costs and utility. Decision trees are commonly used in operations research, along with machine learning. There are several algorithms that generate optimal, such as C4.5, C5 and CART. These traditional decision trees are operable on a single machine and are not operable for big data applications having large datasets, using, for example, a Hadoop® distribution.

SUMMARY

An embodiment of the present invention relates to a method, and associated computer system and computer program product, for optimizing tree pruning for decision trees. One or more processors of a computer system split a first dataset into a training dataset and a testing dataset. The one or more processors of the computer system grow the training dataset into a first decision tree. The one or more processors of the computer system sample the training dataset by creating a plurality of sampling datasets from the training dataset. The one or more processors of the computer system prune the first decision tree using the plurality of sampling datasets. The one or more processors of the computer system create a plurality of models, at least one for each of the plurality of sampling datasets. The one or more processors of the computer system verify the accuracy of each of the plurality of models, using the testing dataset.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Traditional decision trees, such as C4.5, C5 and CART, are operable on a single machine and are not operable for big data applications having large datasets, using, for example, a Hadoop® distribution. When large datasets are required to be analyzed with a decision tree, an out of memory state (OOM) may occur because a machine will need to cache all datasets being processed. When a computer is an OOM state, all the memory of a computer may be allocated toward the decision tree growing and pruning structure because of the large amount of data required to be analyzed.

The present invention resolves the above-described issues by providing a process for doing decision tree analysis in a distribution environment having a plurality of working machines processing very large datasets. The present invention increases the performance of decision tree analysis in these types of "big data" environments. The present invention avoids a single machine running many processes or jobs during a decision tree prune process by utilizing a Hadoop® or Apache Spark® cluster. The present invention allows a user to control sampling dataset sizes and thereby control machine memory usage to prevent out of memory states occurring on the machines in the cluster. These advances over prior art decision tree operations significantly increase machine performance and enables decision tree analysis to be conducted on large datasets.

Figure 1:
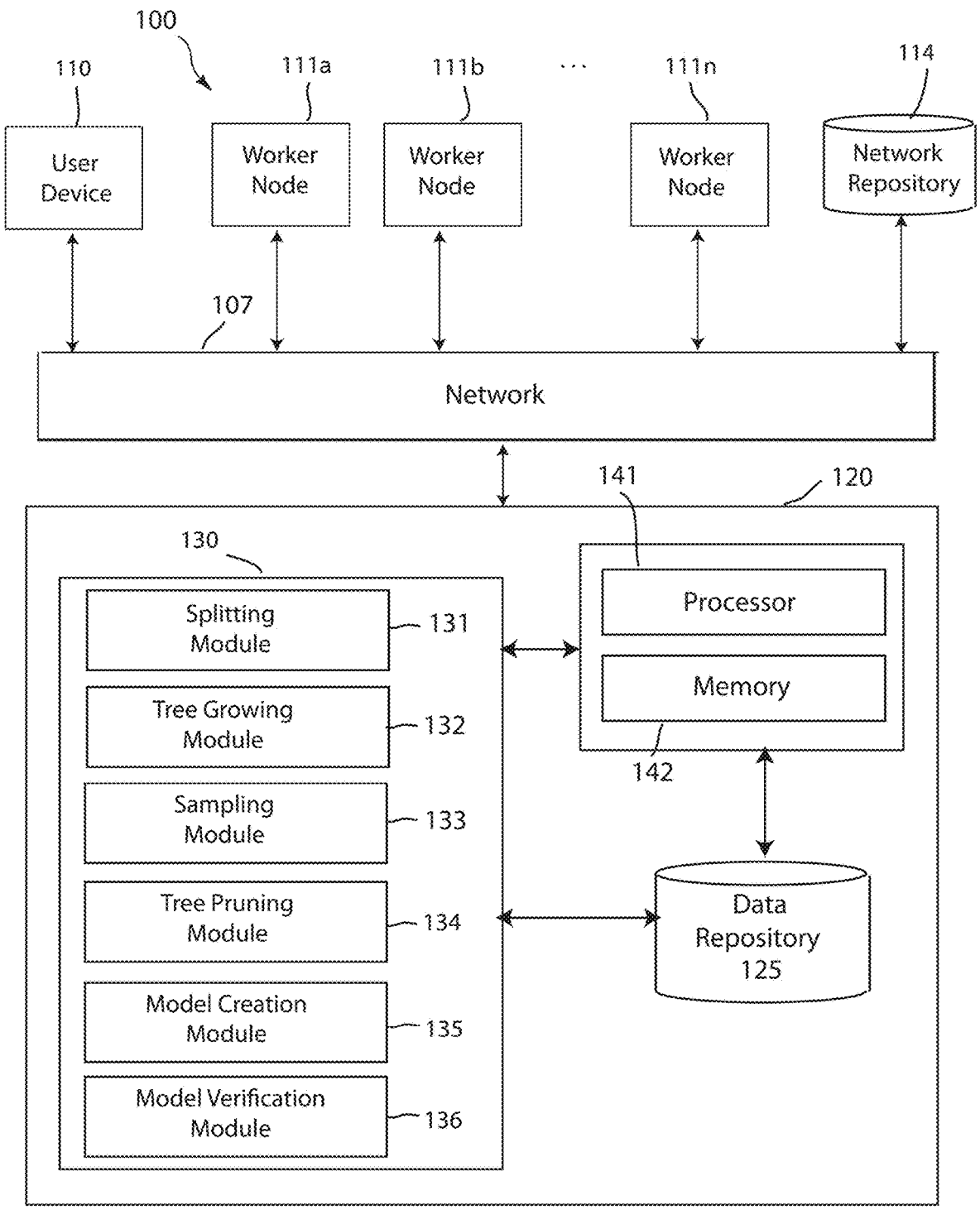
FIG. 1 depicts a block diagram of a system for optimizing tree pruning for decision trees, in accordance with embodiments of the present invention.

Referring to the drawings, FIG. 1 depicts a block diagram of a system for optimizing tree pruning for decision trees 100, in accordance with embodiments of the present invention. Embodiments of a system for optimizing tree pruning for decision trees 100 may be described as a system for optimizing decision tree analysis or tree pruning for large datasets or big data. The system for optimizing tree pruning for decision trees 100 may obtain or otherwise be provided one or more large datasets of information desired to be processed using a decision tree analysis. The system for optimizing tree pruning for decision trees 100 may utilize this information to perform decision tree analysis to augment a decision-making process with supporting evidence or reliable, validated predictions. The system for optimizing tree pruning for decision trees 100 may utilize this information to perform a decision tree classification analysis, such as the creation of shopping profiles in the case the information is shopping data. The system for optimizing tree pruning for decision trees 100 may utilize this information to perform decision tree regression analysis, such as in the creation of a monthly spend forecast in the case the information is spending data. Whatever the type of decision tree analysis, the system for optimizing tree pruning for decision trees 100 is particularly configured for analyzing or processing, using one or more decision trees, large data sets over a cluster or distribution of working computers or processing nodes.

Embodiments of the system for optimizing tree pruning for decision trees 100 may comprise a user device 110 communicatively coupled to a computer system 120 over a network 107. While only one user device 110 is shown, the number of user devices 110 connecting to computer system 120 over network 107 may vary from embodiment to embodiment. The number of user devices 110 may be dependent on the number of users operating in the system for optimizing tree pruning for decision trees 100. Embodiments of the user device 110 may include a computing device, such as a desktop computer, laptop computer, smartphone or tablet device, associated with or operated by the user. The user device 110 may also be a wearable device such as a smart watch or the like.

The user device 110 may be configured to provide the system for optimizing tree pruning for decision trees 100 with user data or information that will then be utilized when performing the decision tree analysis by the computer system 120 and/or one or more worker nodes 111a, 111b, . . . 111n, as described herein below. Information provided by the user device 110 to the computer system 120 may be information input by a user or acquired by various sensors located within the user device 110. In the event that the system for optimizing tree pruning for decision trees 100 is utilizing decision tree analysis to enhance or apply machine learning, there may be many user devices 110 providing the computer system 120 with information. This information may be utilized by the computer system 120 for performing decision analysis aimed at teaching the computer system 120 from the data or information being provided to it.

User devices 110 in the system for optimizing tree pruning for decision trees 100 may also represent users using devices seeking an analysis to be completed on large datasets. For example, the user device 110 may be a user operating on a computer that provides a request to the computer system 120 to perform an analysis on the information in stored in the system for optimizing tree pruning for decision trees 100. The user device 110 may include an operator interface hosted by the computer system 120, for example, that allows the user to interact with the computer system 120 and request a decision tree analysis, such as a regression analysis or a classification analysis, to be conducted.

A network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computer system 120 and the user device(s) 110, a connection to one or more network accessible knowledge bases containing information of one or more users, network repositories 114 or other systems connected to the network 107 that may be considered nodes of the network 107. In some embodiments, where the computer system 120 or network repositories 114 allocate resources to be used by the other nodes of the network 107, the computer system 120 and network repository 114 may be referred to as servers. The network repositories 114 may be a location where the large datasets or other information is located that will be the subject of a decision tree analysis by the system for optimizing tree pruning for decision trees 100.

The network repository 114 may be a data collection area on the network 107 which may back up and save all the data transmitted back and forth between the nodes of the network 107. For example, the network repository 114 may be a data center saving and cataloging user data sent by the user device 110 and/or worker nodes 111a, 111b, . . . 111n, described herein below. In some embodiments, a data collection center housing the network repository 114 may include an analytic module capable of analyzing each piece of data being stored by the network repository 114. Further, the computer system 120 may be integrated with or as a part of the data collection center housing the network repository 114. In some alternative embodiments, the network repository 114 may be a local repository (not shown) that is connected to the computer system 120.

The system for optimizing tree pruning for decision trees 100 may further include one or more worker nodes 111a, 111b, . . . 111n. The worker nodes 111a, 111b, . . . 111n may be computer systems connected to the computer system 120. The worker nodes 111a, 111b, . . . 111n may each be processors, computers, or servers of a distributed processing framework such as an Apache Hadoop® or Spark® system. The worker nodes 111a, 111b, . . . 111n may be connected to the computer system 120, the user device 110 and/or the network repository 114 over the network 107. The worker nodes 111a, 111b . . . 111n may each be provided with information from the computer system 120 that the worker nodes 111a, 111b, . . . 111n may utilize to perform portions of a decision tree analysis, such as growing and/or pruning a decision tree or portion thereof.

Embodiments of the computer system 120 may include a module system 130 including a splitting module 131, a tree growing module 132, a sampling module 133, a tree pruning module 134, a model creation module 135, and a model verification module 136. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the splitting module 131 may include one or more components of hardware and/or software program code for splitting a large dataset into a training dataset and a testing dataset. For example, the system for optimizing tree pruning for decision trees 100 may be provided one large dataset. The splitting module 131 may be configured to split the large dataset into two parts—a training dataset and a testing dataset. The training dataset may include a majority of the data from the large dataset, while the testing dataset may include a smaller portion of the data. In performing the splitting, the splitting module 131 may also perform an analysis to ensure that the testing dataset and the training dataset are similar. The splitting module 131 may ensure that the testing dataset and the training dataset are similar by randomly splitting the information or data. However, other splitting methods are contemplated.

Embodiments of the growing module 132 may include one or more components of hardware and/or software program code for growing the training dataset into a decision tree. The growing module 132 may thus be employed by the system for optimizing tree pruning for decision trees 100 after the splitting module 131 breaks up or splits the large dataset into the training dataset and the testing dataset. The tree growing module 132 may thus be configured to grow the training dataset. The growing module 132 may include defining classes and labels for each split of the decision tree. The growing module 132 may include the ability to split a decision tree from a root node into various subsets of data, and create leaves (when no more splitting occurs). The growing module 132 may include breaking up or splitting the large training dataset and/or various subsets in the decision tree. The growing module 132 may be configured to determine, when predetermined conditions are satisfied, when no more tree splitting, or growing, is required.

Referring still to FIG. 1, embodiments of the computer system 120 may further include the sampling module 133 for sampling the training dataset by creating a plurality of sampling datasets from the training dataset. Embodiments of the sampling module 133 may refer to configurations of hardware, software program code, or combinations of hardware and software programs, capable of breaking apart the large dataset into the various samples. The sampling module 133 may further be configured to provide one or more of these subdivided samples of the training dataset to various other machines, such as the worker nodes 111a, 111b, . . . 111n for performing growing and/or pruning of the samples. The sampling module 133 may be configured to perform important sampling and/or sampling with the replacement when creating the various samples of the training dataset. The combination of important sampling and/or sampling with the replacement performed by the sampling module 133 may be configured to maintain the similarity of the subdivided sampling datasets with the training dataset and/or the testing dataset. The sampling module 133 may be configured to allow a user to control the size of the sampling datasets from the training dataset. This may allow a user to ensure that the training dataset is sufficiently broken into samples small enough that tree growing and/or pruning can be performed without running out of memory.

With continued reference to FIG. 1, embodiments of the computer system 120 may include a pruning module 134. Embodiments of the pruning module 134 may include one or more components of hardware and/or software program code for pruning a decision tree using the plurality of sampling datasets created by the sampling module 133. For example, the pruning module 134 may be configured to prune a decision tree, or a portion of a decision tree, grown from one or more of the samples created by the sampling module 133.

Pruning a decision tree by the pruning module 134 may entail reducing the size of the decision tree by removing sections of the tree that provide little power to make a classification, or in other words provide little or no new information in the decision tree. The pruning module 134 may be configured to reduce the size of the decision tree without reducing predictive accuracy of the decision tree. The pruning module 134 may be configured to perform reduced error pruning, or cost complexity pruning, for example.

The pruning module 134 may be configured to prune a decision tree grown from the sampling dataset created by the sampling module 133. The pruning module 134 may select pruning nodes from one of the plurality of sampling datasets created by the sampling module 133. The pruning module 134 may determine if the selected pruning nodes are in memory. If the pruning nodes are in memory, the pruning module 134 may perform a pruning function in memory. The pruning module 134 may continue to select and prune pruning nodes until it is determined that no pruning nodes remain in memory to select.

With continued reference to FIG. 1, embodiments of the computer system 120 may include a model creation module 135. Embodiments of the model creation module 135 may include one or more components of hardware and/or software program code for creating a plurality of models, at least one for each of the plurality of sampling datasets. The model creation module 135 may be configured to determine when pruning and/or growing of the decision tree is complete for one of the sampling datasets and create a model after this is determined. The model creation module 135 may thus be configured to create one or more models, each corresponding to a particular one of the plurality of sample datasets created by the sampling module 133, grown by the growing module 132 and pruned by the pruning module 135.

Embodiments of the computer system 120 may include a model verification module 136. Embodiments of the model verification module 136 may include one or more components of hardware and/or software program code for verifying the accuracy of each of the plurality of models, using the testing dataset created by the splitting module 131. The model verification module 136 may be configured to receive completed models from one of the worker nodes 111a, 111b, . . . 111n, or obtain a model grown and pruned within the computer system 120 from one of plurality of sample datasets created by the sampling module 133. The model verification module 136 may be configured to perform a verification process on each of the models created in the system for optimizing tree pruning for decision trees 100, whether the models are created by the worker nodes 111a, 111b, . . . 111n and sent to the verification module 136, or created internally in the computer system 120. Whatever the embodiment, when each of the models have been verified, the model verification module 136 may be configured to determine the most accurate model and provide the most accurate model as the final model of an output of the decision tree.

Still further, the computer system 120 may include a receiving module and a transmitting module (not shown) for receiving information from the various devices in the system for optimizing pruning for decision trees 100. For example, the transmitting module of the computer system 120 may be configured to transmit the plurality of sample datasets created by the sampling module 133 to the various worker nodes 111a, 111b . . . 111n in the system 100. Similarly, the receiving module of the computer system 120 may be configured to receive completed models from the various worker nodes 111a, 111b, . . . 111n in the system 100 for processing with the model verification module 136.

Referring still to FIG. 1, embodiments of the computer system 120 may be equipped with a memory device 142 which may store the location information, information related to the information and datasets being processed using decision tree analysis as described herein, and a processor 141 for implementing the tasks associated with the system for optimizing tree pruning for decision trees 100.

Utilizing the module system 130, the system for optimizing tree pruning for decision trees 100 may be configured to perform machine learning to augment a decision-making process with supporting evidence or reliable, validated predictions. For example, imagine a data scientist may be enabled to forecast average monthly revenue per user by using regression decision tree analysis on data sets related to shopping behavior. Alternatively, the data scientist could point to a discrete shopping profile of each user using a classification decision tree analysis. Using the system for optimizing tree pruning for decision trees 100, both the classification and regression analyses can be achieved with a decision tree on large datasets using a cluster of working computers or servers, or other distribution network.

Figure 2:
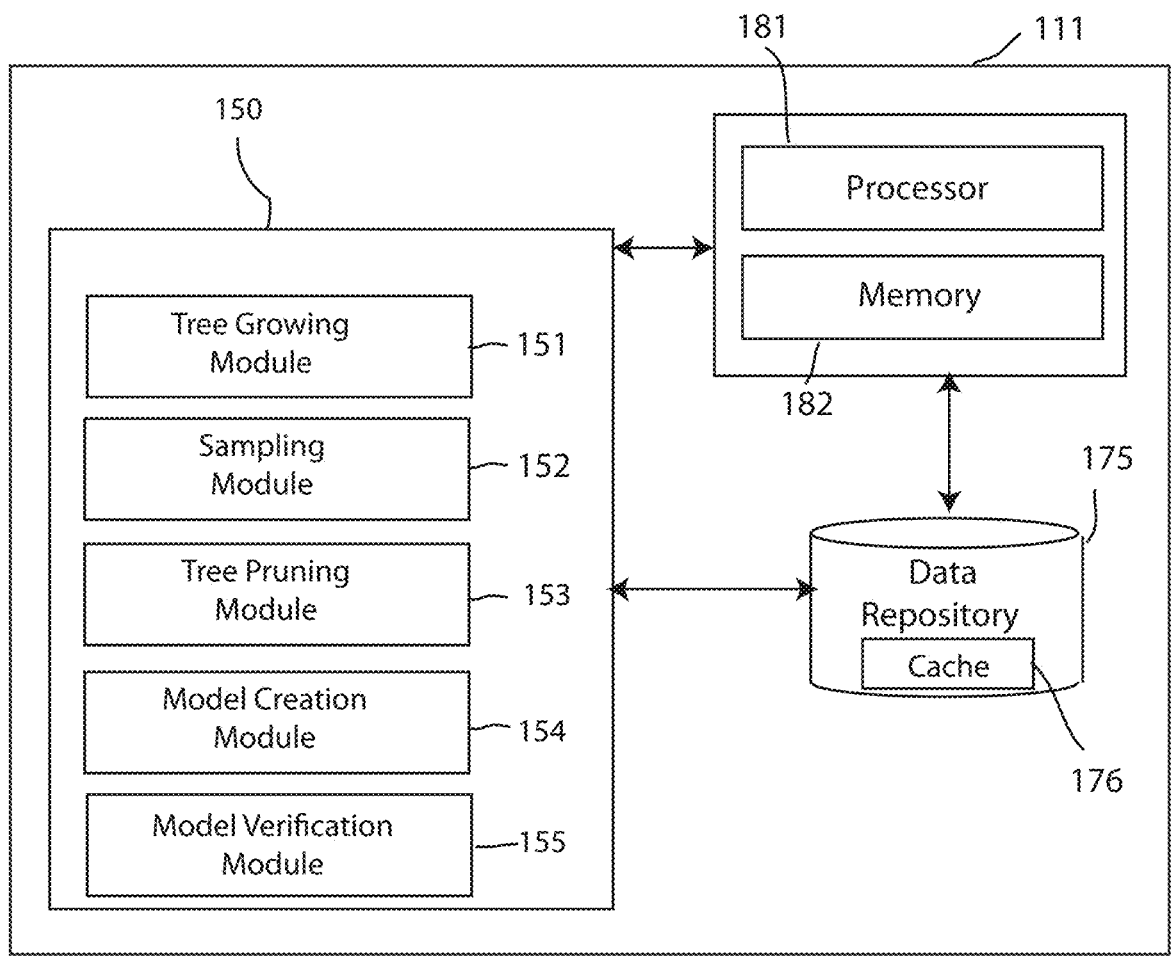
FIG. 2 depicts a block diagram of a worker node of the system for optimizing tree pruning for decision trees of FIG. 1, in accordance with embodiments of the present invention.

Referring to FIG. 2, a block diagram of an exemplary worker node 111, such as one of the worker nodes 111a, 111b, . . . 111n, of the system for optimizing tree pruning for decision trees 100 is shown in accordance with embodiments of the present invention. The worker node 111 may include a processor 181 that is similar to, or the same as, the processor 141 of the computer system 120, memory 182 that is similar to, or the same as, the memory 142 of the computer system 120, a data repository 175 that is similar to, or the same as, the data repository 125 of the computer system 120. The data repository 175 may include a cache for storing data that will be utilized by the worker node 111. The worker node 111 may include a tree growing module 151 that is similar to, or the same as, the tree growing module 132 of the computer system 120. The worker node 111 may include a sample module 152 that is similar to, or the same as, the sample module module 133 of the computer system 120. The worker node 111 may include a tree pruning module 153 that is similar to, or the same as, the tree pruning module 134 of the computer system 120. The worker node 111 may include a model creation module 154 that is similar to, or the same as, the model creation module 135 of the computer system 120.

The worker node 111 may be configured to receive one or more of the sample datasets created by the sampling module 133 of the computer system 120. The worker node 111 may be configured to place the data of the sample dataset into cache, because it may be a smaller subset of data relative to the training dataset and/or the testing dataset. The worker node 111 may be configured to utilize the tree growing module 151 to grow the received sample dataset, the tree pruning module to prune the grown tree from the sample dataset, and create a model by completing the growing and/or pruning the decision tree from the received sample dataset, as described herein above. Once the model is complete, the worker node 111 may be configured to provide this completed model to the computer system 120 so that the computer system may perform model verification using the model verification system 136 and select a final model from all of the models created by the various split data samples created by the sampling module 133. The worker node 111 may include one or more of the other models of the computer system 120, such as the sampling module 152, as shown. The worker node 111 may be configured to create further samples from the provided sample dataset, if necessary to further divide the process, depending on how large the overall training dataset is, and how large the sample dataset is. The worker node 111 may further include a model verification module 155 to determine which of various sub samples is the best model to provide back to the computer system 120 for final model verification by the model verification module 136. Alternatively, the worker node 111 may be configured to receive the testing dataset so that the model verification module 155 may use the testing dataset to determine an accuracy of the model. The worker node 111 may thus provide the accuracy-tested model back to the computer system 120 for a determination of which model included the best accuracy by the model verification module 136 of the computer system 120.

Figure 3:
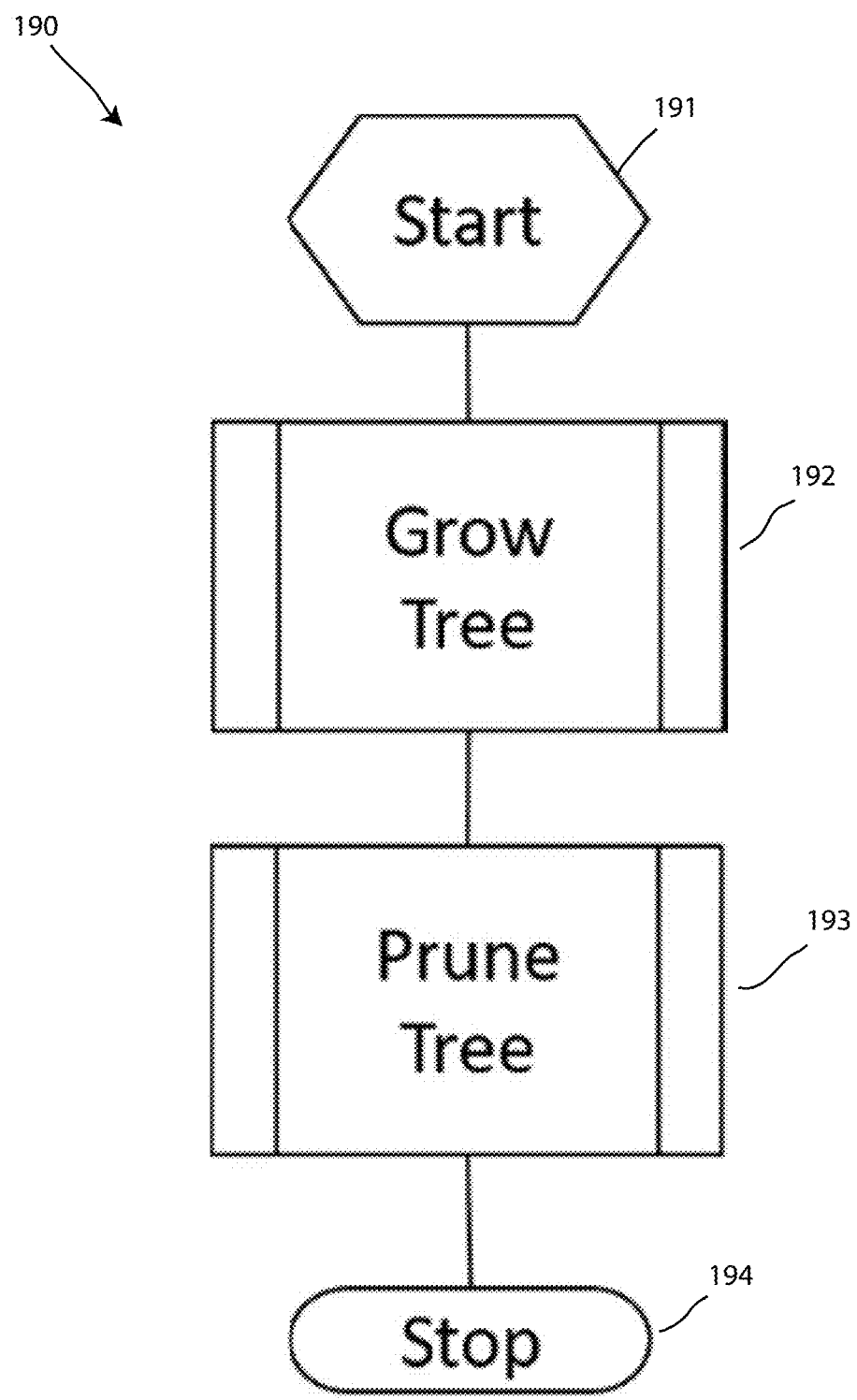
FIG. 3 depicts a flow chart of a method for tree induction, in accordance with embodiments of the present invention.

FIG. 3 depicts a flow chart of a method for tree induction 190, in accordance with embodiments of the present invention. The method 190 may be a general method that is performed by the various computer systems 120 and/or worker nodes 111 described herein. The method for tree induction 190 may include a first step 191 of starting a decision tree induction process. The method 190 may include a step 192 of growing a decision tree and/or a portion of a decision tree. The method may then include a step 193 of pruning a grown decision tree and/or a portion of a decision tree. The method 190 may then include a stop 194 of stopping once it is determined that a decision tree is sufficiently grown and pruned.

Figure 4:
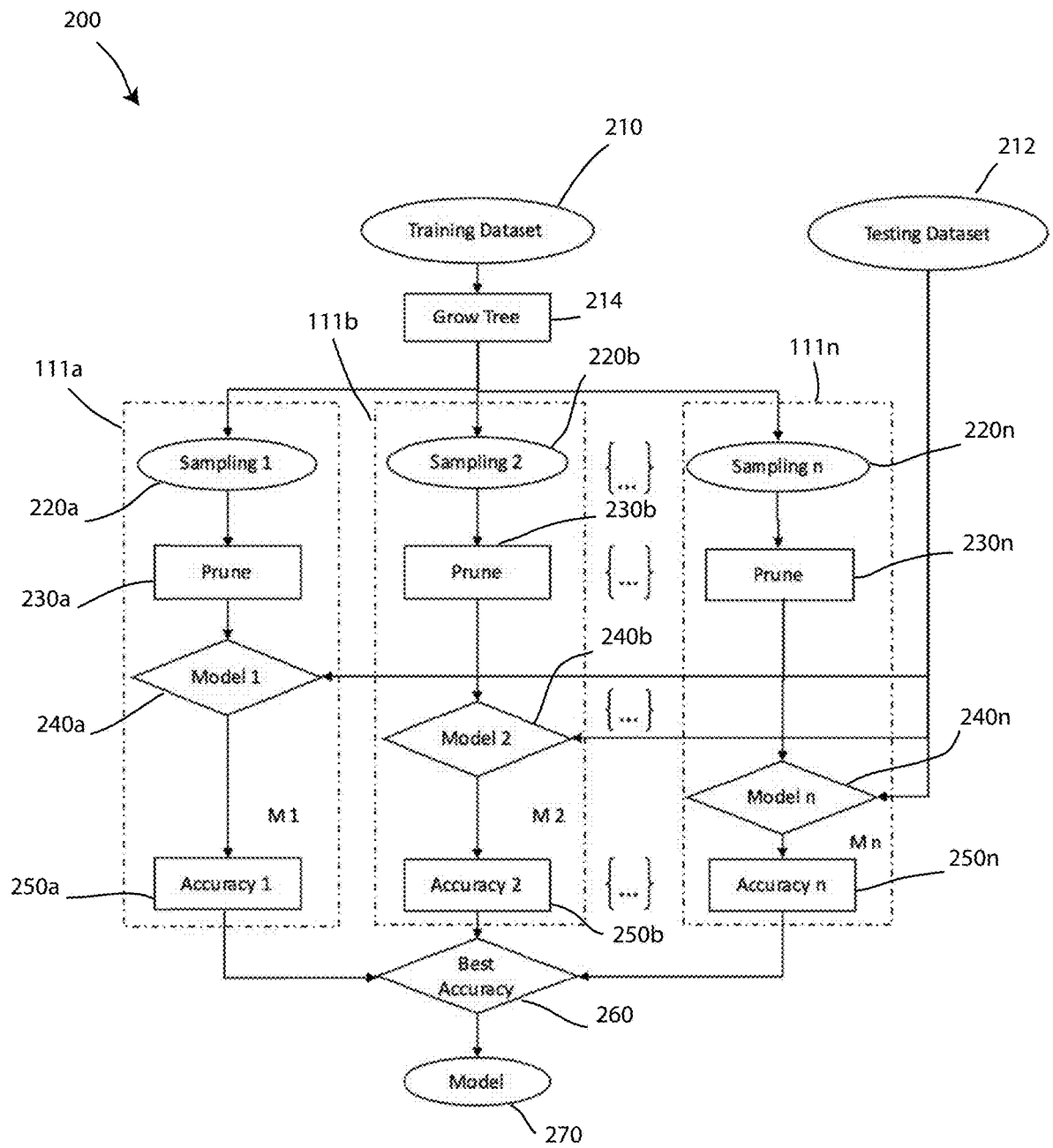
FIG. 4 depicts flow chart of a method for optimizing tree pruning for decision trees, in accordance with embodiments of the present invention.

FIG. 4 depicts flow chart of a method for optimizing tree pruning for decision trees 200, in accordance with embodiments of the present invention. The method 200 may be a more specific method of decision tree growing and pruning that is performable by the system for optimizing tree pruning for decision trees 100 described herein above. The method 200 may include a first step of splitting, by for example the processor 141 of the computer system 120, a dataset, such as a big or large dataset, into a training dataset 210 and a testing dataset 212. The method may include a next step 214 of growing, by the processor, the training dataset into a first decision tree. The method may include a next step of sampling, by the processor, the training dataset by creating a plurality of sampling datasets 220a, 220b, . . . 220n from the training dataset 210. The step of sampling the training dataset by creating a plurality of sampling datasets 220a, 220b, . . . 220n may include controlling the size of the sampling datasets 20a, 220b, . . . 220n.

The method may include providing one of these plurality of sampling datasets 220a, 220b, . . . 220n to each of a plurality of worker nodes 111a, 111b, . . . 111n, respectively. The method may include storing these datasets 220a, 220b, . . . 220n into cache memory of a single machine by the worker nodes 111a, 111b, . . . 111n. The method may then include a step 230a, 230b, . . . 230n of pruning, by the processors of the worker nodes 111a, 111b, . . . 111n, the respective decision trees created by the respective worker nodes 111a, 111b, . . . 111n for each of the plurality of sampling datasets 220a, 220b, . . . 220n. Thus, the growing and pruning may be completed on a distribution cluster such that the growing and pruning of each of the plurality of sampling datasets occurs on a different machine. The method may include a step of creating, by the processors 181 of the worker nodes 111a, 111b, . . . 111n, completed models 240a, 240b, . . . 240n after the pruning 230a, 230b, . . . 230n. The method may include utilizing the testing dataset 212 by each of the worker nodes 111a, 111b, . . . 111n to test the accuracy of the models 240a, 240b, . . . 240n and determine an accuracy 250a, 250b, . . . 250n, respectively. In other embodiments, the completed models 240a, 240b, . . . 240n created by the worker nodes 111a, 111b, . . . 111n may be provided to the computer system 120 for accuracy testing. The accuracy verification can begin as soon as the first of the plurality of models 240a, 240b, . . . 240n are created. The accuracy verification may begin and occur in the order in which the models 240a, 240b, . . . 240n are created and/or completed.

As shown, the models 240a, 240b, . . . 240n and/or accuracy determinations 250a, 250b, . . . 250n may be provided to the computer system 120 for the step of final verifying and determining the best accuracy 260 of each of the models 240a, 240b, . . . 240n. The method may include determining a final model 270 from whichever of the models 240a, 240b, . . . 240n has the best accuracy.

Figure 5:
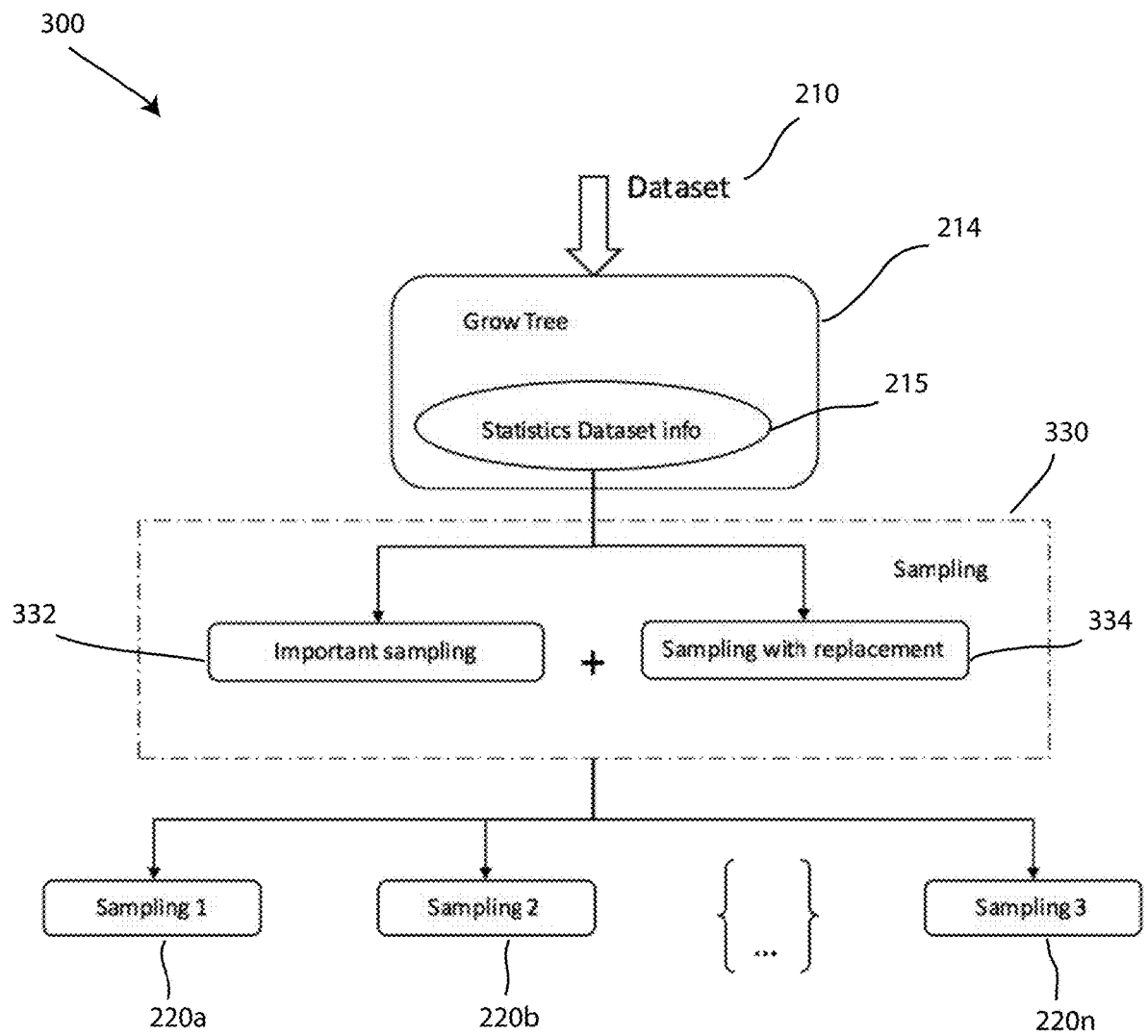
FIG. 5 depicts a flow chart of a sampling process of the method for optimizing tree pruning for decision trees of FIG. 3, in accordance with embodiments of the present invention.

FIG. 5 depicts a flow chart of a sampling process 300 of the method for optimizing tree pruning for decision trees 200, in accordance with embodiments of the present invention. The process 300 may include the first steps of the method 200 described hereinabove, and may be completed by the computer system 120. The process 300 may include being provided with a training dataset 210 and beginning to grow a decision tree 214 from the training dataset 210 using statistics dataset information 215. The process 300 may include a next step of sampling 330 the training dataset 210 by both important sampling 332 and sampling with replacement 334. The process 300 may then include providing the created samples 220a, 220b, . . . 220n, creating using one or both of important sampling 332 and sampling with replacement 334, to the various worker nodes 111a, 111b, . . . 111n.

Figure 6:
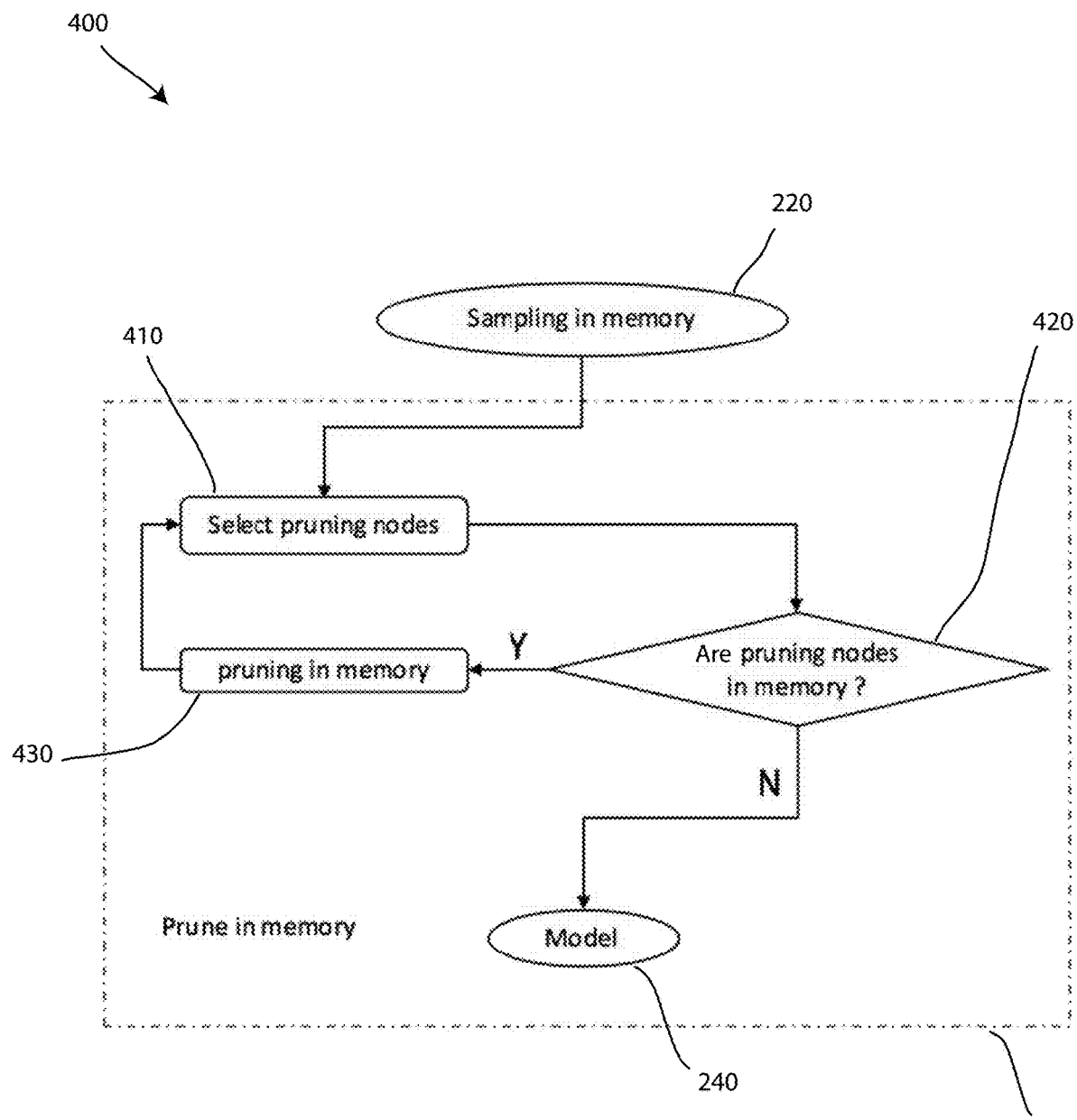
FIG. 6 depicts a flow chart of a pruning process of the method for optimizing tree pruning for decision trees of FIG. 3, in accordance with embodiments of the present invention.

FIG. 6 depicts a flow chart of a pruning process 400 of the method for optimizing tree pruning for decision trees 200, in accordance with embodiments of the present invention. The process 400 may include on a worker node 111 after receiving one of the sampling datasets 220 as described herein above. The process 400 may include storing the sampling dataset 220 in a cache memory, such as the cache 176, of the worker node 111 machine. The process 400 may include a step 410 of selecting pruning nodes from the received sampling dataset 220. The process 400 may include a step 420 of determining if the selected pruning nodes are in memory. If the pruning nodes are in memory, the process 400 may include a step 430 of performing a pruning function in memory. The process 400 may continue to select and prune pruning nodes 410, 430 until it is determined at a step 420 that no pruning nodes remain in memory to select. The method may then include providing a pruned model 240 for accuracy testing and verification.

Advantageously, the present invention may avoid a single computer or machine from performing many functions or jobs while performing a decision tree analysis on very large datasets. The present invention may allow a user to control the sampling dataset size that is then run in the memory of worker nodes in the distribution environment. The present invention may further avoid out of memory scenarios because the controllable and smaller size of the sampling datasets that are each processed on their own individual machines. The present invention allows for analysis of large datasets in a distribution environment over a cluster of various machines. The present invention significantly increases performance of a cluster of machines for decision tree analysis on large datasets, making such analysis possible without running out of memory. The present invention takes a decision tree analysis and makes it possible to perform growing and/or pruning operations across a number of different machines (one for each sample dataset) in order to allow for such analysis on large datasets that couldn't otherwise be analyzed without significant performance problems or running out of memory.

Figure 7:
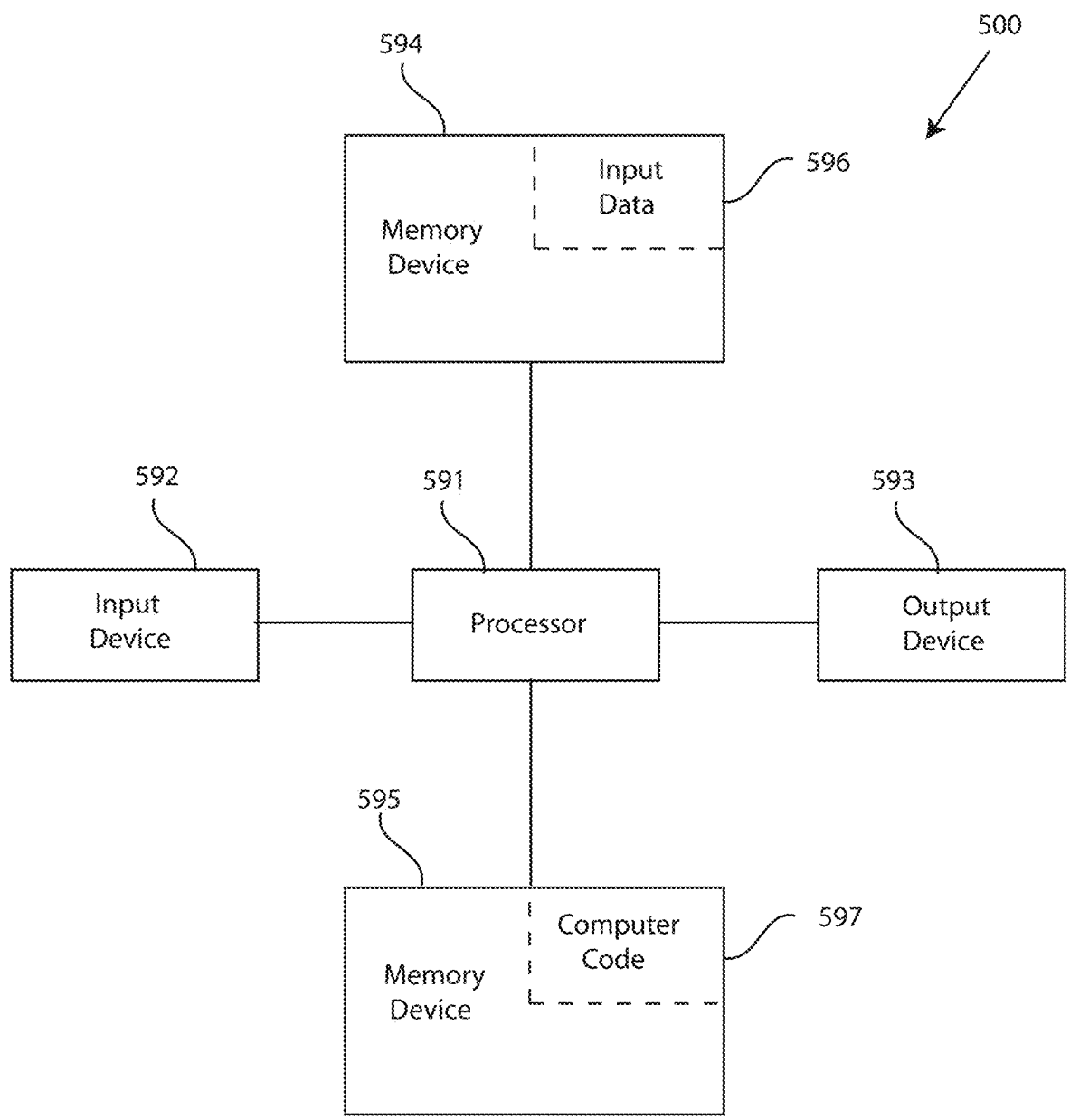
FIG. 7 depicts a block diagram of a computer system for the topic based collaborative recording and retrieving system of FIGS. 1 and 2, capable of implementing methods for optimizing tree pruning for decision trees of FIGS. 3-6, in accordance with embodiments of the present invention.

FIG. 7 illustrates a block diagram of a computer system for the system for optimizing tree pruning for decision trees of FIGS. 1-2, capable of implementing methods for optimizing tree pruning for decision trees of FIGS. 3-6, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for optimizing tree pruning for decision trees, in the manner prescribed by the embodiments of FIGS. 3-6 using the system for optimizing tree pruning for decision trees of FIGS. 1-2, wherein the instructions of the computer code 597 may be executed by processor 591 via memory device 595. The computer code 597 may include software or program instructions that may implement one or more algorithms for implementing the methods for optimizing tree pruning for decision trees, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 7.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods for optimizing tree pruning for decision trees. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to optimize tree pruning for decision trees. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for optimizing tree pruning for decision trees. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for optimizing tree pruning for decision trees.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
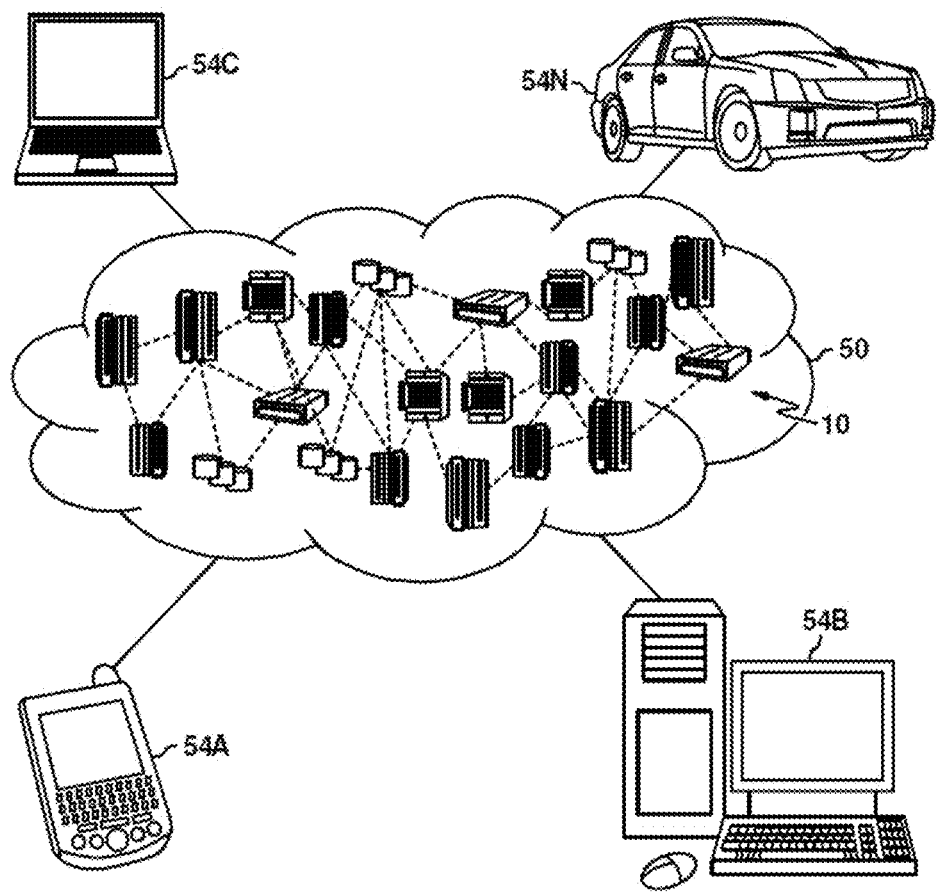
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
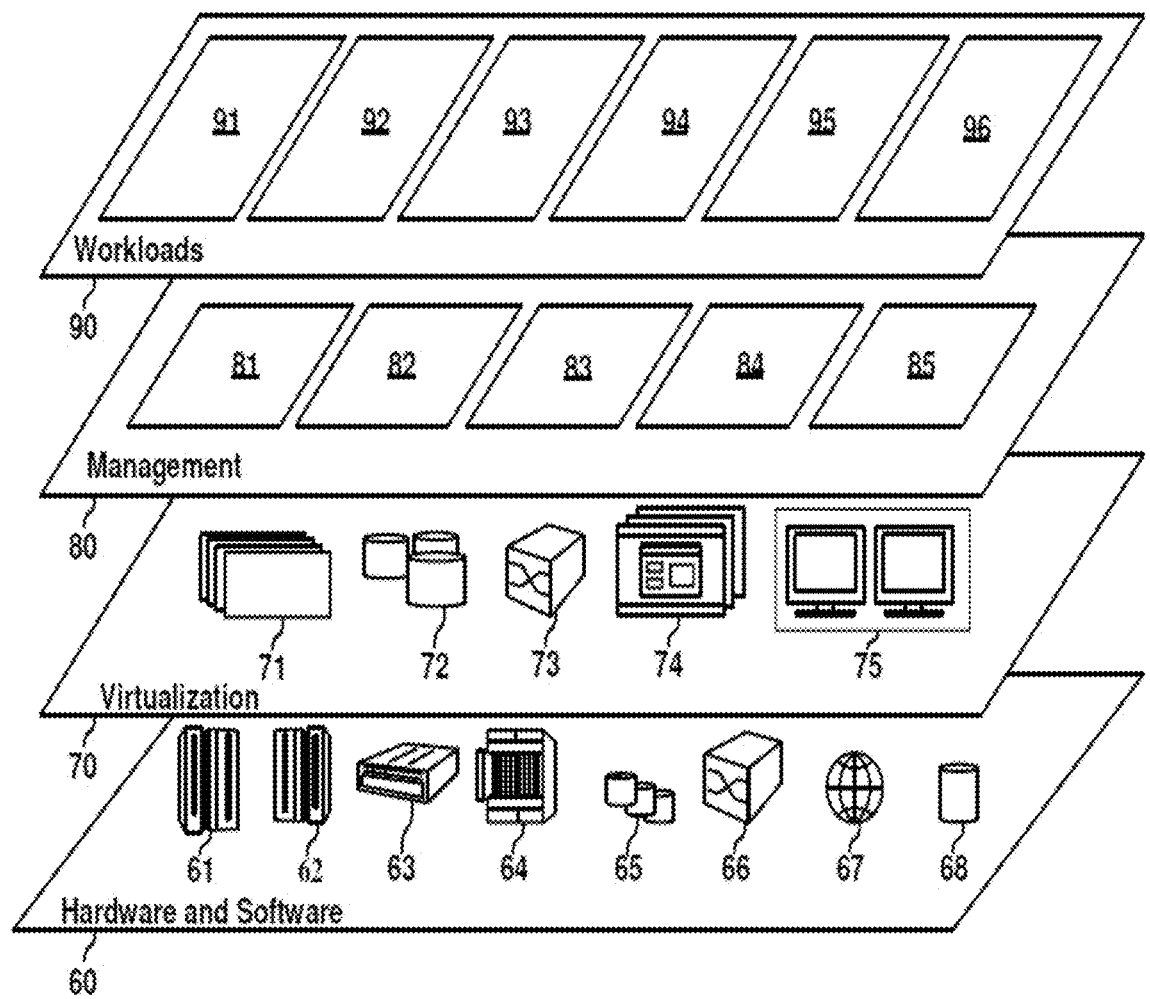
FIG. 9 depicts abstraction model layers, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing, growing and pruning of decision trees 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of optimizing tree pruning for a decision tree, the method comprising:
   splitting, by one or more processors of a computer system, a first dataset into a training dataset and a testing dataset;
   growing, by the one or more processors of the computer system, the training dataset into a first decision tree;
   sampling, by the one or more processors of the computer system during the growing, the training dataset by creating a plurality of sampling datasets from the training dataset;
   pruning, by the one or more processors of the computer system, the first decision tree using the plurality of sampling datasets;
   creating, by the one or more processors of the computer system, a plurality of models, at least one for each of the plurality of sampling datasets; and
   verifying, by one or more processors of a computer system, the accuracy of each of the plurality of models, using the testing dataset.

2. The method of claim 1, wherein each of the plurality of datasets comprises one machine cache.

3. The method of claim 1, further comprising determining, by the one or more processors of the computer system, a most accurate model from the plurality of models.

4. The method of claim 1, wherein the pruning is completed on a distribution cluster such that the pruning of each of the plurality of sampling datasets occurs on a different machine, and wherein the growing is completed on the distribution cluster such that the growing the training dataset into the first decision tree includes growing each of the plurality of sampling datasets on a different machine.

5. The method of claim 1, wherein the sampling further includes important sampling and sampling with replacement.

6. The method of claim 1, wherein the verifying the accuracy of each of the plurality of models begins as soon as a first of the plurality of models are created, wherein verifying the accuracy of each of the plurality of models occurs in the order each of the plurality of models is created.

7. The method of claim 1, wherein the sampling occurs on a first machine of a distribution cluster, and wherein the pruning of each of the plurality of sampling datasets occurs on one or more machines that are not the first machine.

8. A computer system, comprising:
one or more processors;
one or more memory devices coupled to the one or more processors; and
one or more computer readable storage devices coupled to the one or more processors, wherein the one or more storage devices contain program code executable by the one or more processors via the one or more memory devices to implement a method of optimizing tree pruning for a decision tree, the method comprising:
splitting, by the one or more processors of the computer system, a first dataset into a training dataset and a testing dataset;
growing, by the one or more processors of the computer system, the training dataset into a first decision tree;
sampling, by the one or more processors of the computer system during the growing, the training dataset by creating a plurality of sampling datasets from the training dataset;
pruning, by the one or more processors of the computer system, the first decision tree using the plurality of sampling datasets;
creating, by the one or more processors of the computer system, a plurality of models, at least one for each of the plurality of sampling datasets; and
verifying, by one or more processors of a computer system, the accuracy of each of the plurality of models, using the testing dataset.

9. The computer system of claim 8, wherein each of the plurality of datasets comprises one machine cache.

10. The computer system of claim 8, the method further comprising determining, by the one or more processors of the computer system, a most accurate model from the plurality of models.

11. The computer system of claim 8, wherein the pruning is completed on a distribution cluster such that the pruning of each of the plurality of sampling datasets occurs on a different machine, and wherein the growing is completed on the distribution cluster such that the growing the training dataset into the first decision tree includes growing each of the plurality of sampling datasets on a different machine.

12. The computer system of claim 8, wherein the sampling further includes important sampling and sampling with replacement.

13. The computer system of claim 8, wherein the verifying the accuracy of each of the plurality of models begins as soon as a first of the plurality of models are created, wherein verifying the accuracy of each of the plurality of models occurs in the order each of the plurality of models is created.

14. The computer system of claim 8, wherein the sampling occurs on a first machine of a distribution cluster, and wherein the pruning of each of the plurality of sampling datasets occurs on one or more machines that are not the first machine.

15. A computer program product, comprising a computer readable hardware storage device storing a computer readable program code, the computer readable program code comprising an algorithm that when executed by one or more processors of a computer system implements a method of optimizing tree pruning for a decision tree, the method comprising:
splitting, by the one or more processors of the computer system, a first dataset into a training dataset and a testing dataset,
growing, by the one or more processors of the computer system, the training dataset into a first decision tree;
sampling, by the one or more processors of the computer system during the growing, the training dataset by creating a plurality of sampling datasets from the training dataset;
pruning, by the one or more processors of the computer system, the first decision tree using the plurality of sampling datasets;
creating, by the one or more processors of the computer system, a plurality of models, at least one for each of the plurality of sampling datasets; and
verifying, by one or more processors of a computer system, the accuracy of each of the plurality of models, using the testing dataset.

16. The computer program product claim 15, wherein each of the plurality of datasets comprises one machine cache.

17. The computer program product of claim 15, the method further comprising determining, by the one or more processors of the computer system, a most accurate model from the plurality of models.

18. The computer program product of claim 15, wherein the pruning is completed on a distribution cluster such that the pruning of each of the plurality of sampling datasets occurs on a different machine, and wherein the growing is completed on the distribution cluster such that the growing the training dataset into the first decision tree includes growing each of the plurality of sampling datasets on a different machine.

19. The computer program product of claim 15, wherein the sampling further includes important sampling and sampling with replacement.

20. The computer program product of claim 15, wherein the verifying the accuracy of each of the plurality of models begins as soon as a first of the plurality of models are created, wherein verifying the accuracy of each of the plurality of models occurs in the order each of the plurality of models is created.

* * * * *